United States Patent [19]

Freelain

[11] Patent Number: 5,678,956

[45] Date of Patent: Oct. 21, 1997

US005678956A

[54] NAVIGATIONAL BYPASS, GATE AND PUMP DEVICE FOR USE IN WATER

[76] Inventor: Kenneth W. Freelain, 1630A Beekman Pl., NW., Washington, D.C. 20009

[21] Appl. No.: 598,218

[22] Filed: Feb. 7, 1996

[51] Int. Cl.⁶ .............................. E02B 7/40; E02B 5/04
[52] U.S. Cl. .............................. 405/99; 405/84; 405/87; 405/95; 251/12
[58] Field of Search ................... 405/87, 95, 99, 405/80, 84; 415/149.2, 149.3, 149.1; 251/12

[56] References Cited

U.S. PATENT DOCUMENTS

| | | | |
|---|---|---|---|
| 523,606 | 7/1894 | Milligan et al. | 405/95 |
| 725,927 | 4/1903 | Bradley | 405/84 |
| 3,345,823 | 10/1967 | Rakcevic | 405/99 |

*Primary Examiner*—Tamara L. Graysay
*Assistant Examiner*—Frederick L. Lagman
*Attorney, Agent, or Firm*—Beveridge, DeGrandi, Weilacher & Young, L.L.P.

[57] ABSTRACT

A pump device includes a motor, a pump body having a first body portion and a second body portion, a shaft connected to the motor and extending into the pump body and an impeller mounted on the shaft between the first and second body portions. A four valve assembly is provided in the pump body. The first and second valves are provided in the first body portion, and the third and fourth valves are provided in the second body portion. This pump device may be used to move an attached gate through fluid. When the gate door is to be moved through the fluid in a first direction, the first valve and the fourth valve are opened (and the second and third valves are closed) so that the fluid moves through the pump body from the fourth valve to the first valve. When the gate door is to be moved in a second direction, the second valve and the third valve are opened (and the first and fourth valves are closed) so that the fluid moves through the pump body from the third valve to the second valve. This gate and pump arrangement may provide a navigational bypass in a body of water. Thus, electricity generating equipment can be included in and around the water body without closing the water to boats, ships and other water traffic.

23 Claims, 6 Drawing Sheets

NAVIGATIONAL BYPASS, GATE AND PUMP DEVICE FOR USE IN WATER

BACKGROUND OF THE INVENTION

Man's dependence on electricity continues to grow, particularly as more areas of the world become developed and industrialized. There is a continued demand for electrical energy. However, coal and fossil fueled power plants have disadvantages in that the supply of these fuels is limited, and the atmosphere is polluted by the waste products from fuel combustion. Furthermore, it is expensive to ship large quantities of coal and fossil fuels to remote locations away from the coal and fuel sources. Nuclear power plants, while cleaner than coal and fossil fuel burning plants, have other disadvantages. Thus, there is a need for clean, convenient sources of power for generating electricity.

Motion of the water in rivers and other bodies of water has long been used as a source of energy for generating electricity and operating machines. For example, water wheels have long been used to supply energy for operating saw mills along rivers. Water power provides a very clean and natural source of energy. However, while the flowing water provides an excellent source of power which may be converted into electrical or mechanical energy, such systems have certain disadvantages. If the river or water body is to be navigated by boats, ships or other water traffic, then one cannot simply build a water wheel across the body of water. This would impede traffic on the body of water. If instead of harnessing the entire river, we only harness a fraction of the river to produce power, the system will not realize full efficiency and potential.

Accordingly, there is a need in the art for a system which would allow one to harness the energy from a flowing, natural body of water, while still allowing water traffic on the body of water to continue unimpeded.

SUMMARY OF THE INVENTION

This invention relates to a navigational bypass system which allows the kinetic energy and potential energy from a water source to be harnessed while still allowing water traffic to pass.

The invention includes a pump device with a motor and a pump body. The motor may be directly mounted on the pump body, or it may be located independent of the pump body. The pump body is divided into a first body portion and a second body portion. A shaft is connected to the motor and extends into the pump body. An impeller is mounted on the shaft in an area of the pump body between the first body portion and the second body portion. Four valves are provided in the pump body. The first and second valves are provided in the first body portion, and the third and fourth valves are provided in the second body portion.

The pump device in accordance with the invention is preferably mounted onto a gate which is to be moved through a fluid, such as water. This is a second aspect of the invention. The gate according to this aspect of the invention has a gate door which includes a first end and a second end. A hinge mount area is provided at the first end of the gate door to define an area for mounting the gate door onto a hinge post. The pump device in accordance with the first aspect of the invention is mounted at a position along the longitudinal length of the gate door, and preferably at the second end of the gate door. This pump device includes the motor, pump body, shaft, impeller and valve structure as described above.

The pump device structure in accordance with one aspect of the invention is particularly suited for moving a gate through a fluid because of its valve structure. When the gate door is to be moved through the fluid in a first rotational direction, the first valve and the fourth valve are opened (and the second and third valves are closed) so that the fluid is pulled by the impeller into the pump body through the fourth valve and leaves the pump body through the first valve. Alternatively, when the gate door is to be moved through the fluid in a second, opposite rotational direction, the second valve and the third valve are opened (and the first and fourth valves are closed) so that the fluid is pulled into the pump body by the impeller through the third valve and leaves the pump body through the second valve. Alternatively, a two directional motor and/or an adjustable impeller may be used to eliminate two valves.

At least one wheel may be provided at the bottom of the gate door to roll upon a surface and to facilitate easier movement of the gate door through the fluid. Preferably a plurality of wheels are provided at the bottom of the gate door. The impeller motor may be mounted directly on the pump body, or it may be mounted at another location, such as on the top or side of the gate door.

In a particularly preferred aspect of the invention, the gate, including the pump device, is used to open and close a navigational bypass in a body of water, such as a river. To provide the navigational bypass, a structural island is provided in the body of water to define a main water body and a bypass water body. By providing the navigational bypass, electricity generating equipment may be provided across the main water body. Preferably, the structural island is man-made, and, if necessary, the bypass water body may be a man-made canal or similar body of water. A hydraulic mill or other water wheel arrangement may be provided across the main body of water for generating electricity, pumping water or otherwise harnessing the energy from the flowing water.

As one preferred arrangement, a hydraulic mill and water pumping system used in this invention may be of the type described in U.S. patent application Ser. No. 08/267,028, filed Jun. 21, 1994 by Kenneth W. Freelain. This U.S. patent application is entirely incorporated herein by reference. Other suitable water pumping systems, electricity generating systems and the like may be utilized without departing from the invention.

To provide the navigational bypass, a first hinge post is provided on either the structural island or on the land along the bank of the water body. A first gate is attached to the first hinge post. This first gate extends at least partially across the bypass water body. In one embodiment of the invention, this gate extends essentially entirely across the bypass water body so that a single gate is used to open and close the navigational bypass. The gate door includes the pump device as described above. As also mentioned above, at least one wheel, and preferably plural wheels, may be provided at the bottom of the first gate door. These wheels will roll along the bottom of the bypass water body to facilitate movement of the first gate door through the bypass water body.

In a second embodiment of the navigational bypass system, a second hinge post is provided. This second hinge post is provided on either the structural island or on the land, at an opposite location from the first hinge post. A second gate is attached to the second hinge post. In this manner, two gates are provided, and each gate extends partially across the bypass water body. Although one gate may be stationary, it is preferred that both gates will be movable.

Preferably, like the first gate, the second gate also will include a pumping device in accordance with the invention so that both the first and the second gates will be movable through the bypass water body. One or more wheels also may be provided at the bottom of the second gate door to assist the gate in moving along the bottom of the bypass water body.

BRIEF DESCRIPTION OF THE DRAWINGS

The invention will be more fully described in the following detailed description, which description will be better understood when considered in view of the attached drawings, wherein.

DETAILED DESCRIPTION OF THE INVENTION

Figure 1:
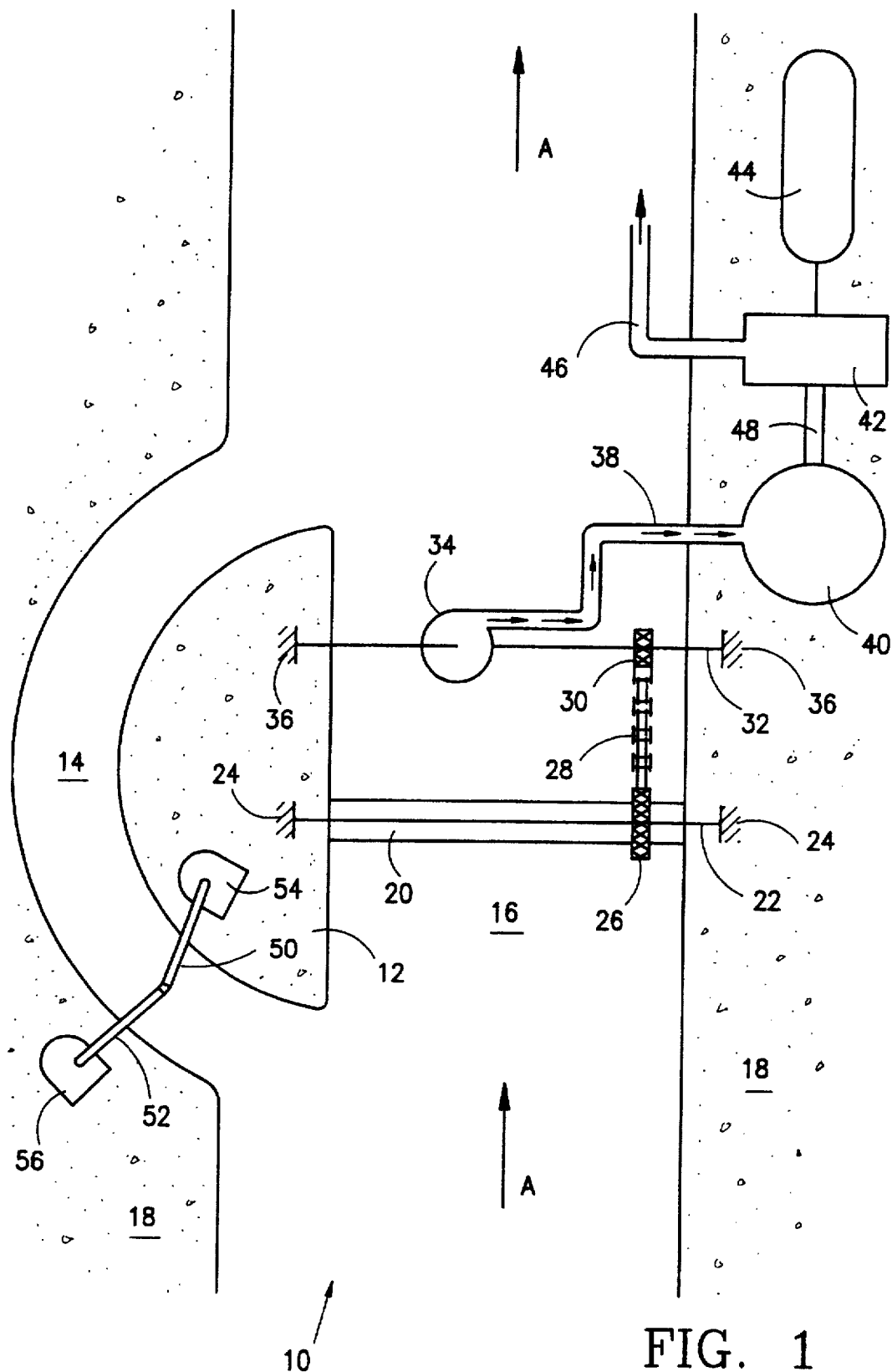
FIG. 1 is an overview of the navigational bypass system in accordance with one aspect of the invention.

The invention relates to a pump device which may be used together with a gate to provide a navigational bypass in a body of water, such as a river. An overview of the navigational bypass system is illustrated in FIG. 1. The body of water is shown generally as reference number 10. In the illustrated arrangement, the body of water 10 is a river, wherein the river is flowing in the general direction indicated by arrows A.

A structural island 12 is provided in or along the river to divide the river into a bypass water body 14 and a main water body 16. The structural island 12 may be man-made or natural. Typically, the structural island 12 is man-made, and a portion of the river bank or dry land 18 may be dug out to form a canal to provide the bypass water body 14. If desired, concrete or other suitable walls may be provided as the side walls and floor of the bypass water body 14. The use of concrete walls and flooring will facilitate a better fit of the gate in the bypass water body 14 and more smooth motion of the gate through the water.

For generating electricity, a hydraulic mill 20 (or water wheel) may be provided across the main water body 16. The hydraulic mill 20 rotates on a mill axle 22 which extends across the main water body 16 and is rotatably mounted on anchors 24 which are provided on the structural island 12 and on one river bank 18. A relatively large driving gear 26 is mounted on the mill axle 22 and rotationally moves with the hydraulic mill 20 under the force of the flowing river.

A chain 28 links the large driving gear 26 to a relatively small driven gear 30. In this manner, relatively slow rotational motion of the large driving gear 26 is translated into relatively fast rotational motion of the smaller driven gear 30. The small driven gear 30 is mounted on the same axle 32 as a pump 34. This axle 32 is rotatably mounted on anchors 36 which also are provided on the structural island 12 and on one river bank 18. The pump 34 may be a centrifugal pump, as shown in the illustrated embodiment, wherein the centrifugal force for operating the pump 34 is provided by the pump axle 32. Alternatively, as described in U.S. patent application Ser. No. 08/267,028, filed Jun. 21, 1994, the pump 34 could be a reciprocating pump. Other suitable pump arrangements also could be used without departing from the invention.

For generating electricity, as also described in the above-identified U.S. patent application, water is pumped from the main water body 16, through conduit 38, and into a reservoir (or water tank) 40 provided on the bank 18. The reservoir 40 may be arranged such that when the water leaves the reservoir 40 through the water tank discharge penstock pipe 48, it may be used to rotate the blades of a hydroturbine 42 and generate electricity via an electric power generator 44. Water is returned to the river from the hydroturbine 42 via the water return line (e.g., pipe 46). The generated current may flow from the generator 44 to consumers for any suitable use via any suitable power transmission facilities, such as electric lines.

The specific power generation system described in this application is provided by way of example. Any suitable electric power generating means may be run from the hydraulic mill 20 without departing from the invention. Furthermore, it is not required that the system be used for providing electrical energy, although that is a preferred use of the energy from the mill 20. The mill 20 may be used to provide rotational energy for any suitable purpose, such as for operating mechanical equipment, without departing from the invention.

The navigational bypass system in accordance with the invention will now be described in more detail. The navigational bypass system includes the bypass water body 14 defined by the structural island 12. During normal electricity generating time periods, the navigational bypass system is kept closed so that a maximum amount of power can be generated. However, when a boat, ship or other water traffic approaches the portion of the river including the hydraulic mill 20, the navigational bypass system may be opened to allow the boat, ship or other water traffic to pass around the hydraulic mill 20 and the electricity generating portion of the river.

In the illustrated embodiment, two gates 50 and 52 extend partially across the bypass water body 14. Gate 50 extends from a hinge post 54 which is anchored on the structural island 12, and gate 52 extends from a hinge post 56 anchored on the river bank 18. These gates 50 and 52 are brought together in the central portion of the bypass water body 14 to reduce water flow through the bypass water body 14. This diverts more water toward the hydraulic mill 20 and increases the electricity generating capacity. When gates 50 and 52 are opened, water flows through the bypass water body 14, thereby allowing a boat or ship to pass through the bypass water channel and around the electricity generating equipment. At this time, power production may be somewhat reduced. When the boat or ship has completed its passage and is beyond the hydraulic mill 20 and electricity generating equipment, the gates 50 and 52 are again closed, thereby diverting the flowing water back to the hydraulic mill 20. It is preferred that the bypass water body 14 be of sufficient size to allow passage of all anticipated water traffic, but not so large that opening the bypass diverts an excessive amount of water from the hydraulic mill 20 and electricity generating equipment. In this way, electricity generation can continue to some extent, even when the bypass is open.

Instead of two gates 50 and 52, a single gate could be used, wherein the single gate extends essentially all the way across the bypass water body 14. The hinge post for this single gate could be located either on the structural island 12 or on the river bank 18.

Figure 2:
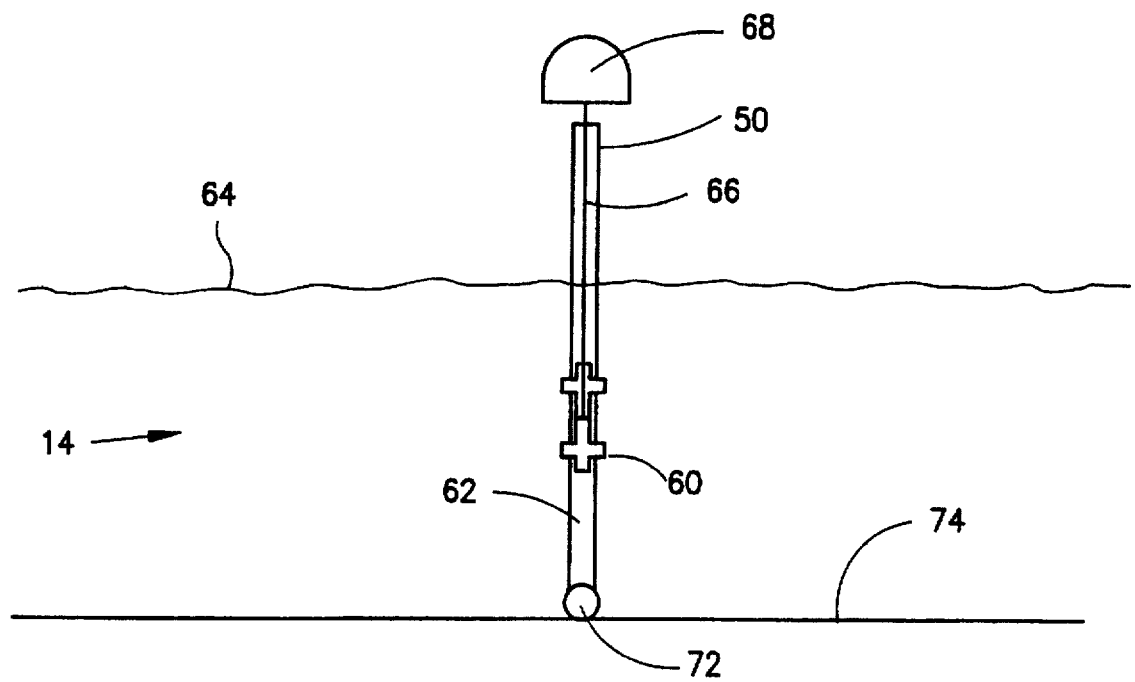
FIG. 2 is a side view of the gate and pump device used in the navigational bypass system in accordance with the invention.

At least one of the gates 50 or 52, and preferably both gates, includes a pump device thereon. The pump device, shown generally as reference number 60 in FIGS. 2-9, assists the gate in moving through the water. FIG. 2 shows a side view of the gate 50 and pump 60 assembly. The pump 60 is mounted at an end face 62 of the gate 50 at a level which would be located beneath the surface 64 of the bypass water body 14 in use. A shaft 66 extends from a motor 68 and into the pump 60 body or casing. The actual structure of the pump 60 will be described in more detail later in this application.

Figure 3:
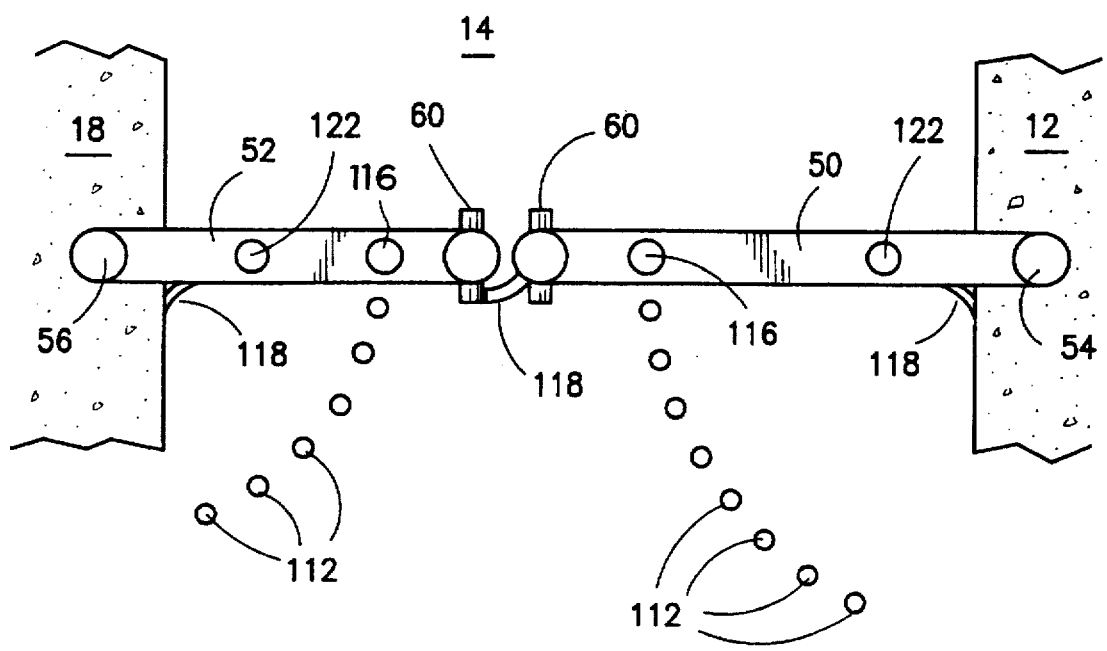
FIG. 3 is a to view of an embodiment of the invention wherein two gate and pump device assemblies are used to open and close the navigational bypass.
Figure 5:
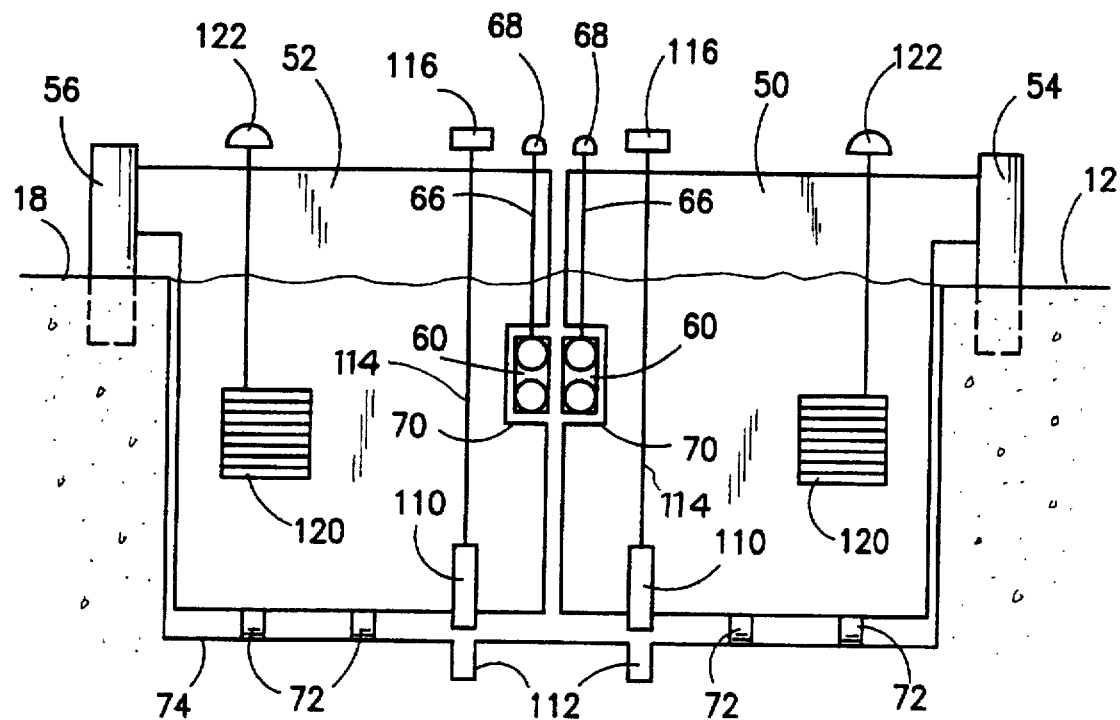
FIG. 5 is a front view of the embodiment of the invention wherein two gate and pump device assemblies are used to open and close the navigational bypass.

An overhead view of the two gate 50 and 52 arrangement is shown in FIG. 3, and a front view thereof is shown in FIG. 5. For purposes of illustration, the motor 68 is not shown in FIG. 3. As shown, the gates 50 and 52 come together in the central area of the bypass water body 14. The two pump devices 60 are arranged essentially side-by-side, and a corresponding slot 70 may be cut out of one or both gates 50 and 52 to provide adequate room for the pumps 60 when the gates 50 and 52 are closed. Alternatively, the two gates 50 and 52 may be arranged in an overlapping manner such that at least a portion of the face of one gate extends in front of and along at least a portion of the face of the other gate.

FIGS. 2 and 5 also show that the bottom of each gate 50 and 52 is provided with wheels 72 to facilitate rolling of the gate 50 or 52 along the bottom 74 of the bypass water body 14. This is particularly convenient when the bypass water body 14 is in the form of a man-made canal having a smooth or relatively smooth bottom 74 made of concrete or other material. The wheels 72 may extend downwardly from the bottom of the gates 50 and 52. Preferably, the wheels 72 do not change their alignment with respect to the bottom of the gate 50 or 52 to which they are attached. In this way, the wheels 72 will maintain a constant angle with respect to the plane of the gates 50 or 52. The side walls of the bypass water body 14 may be man-made, e.g., from concrete.

As shown in FIGS. 3 and 5, cavities 112 are provided along an arc on the bottom 74 of the bypass water body 14. These cavities 112 are positioned to receive a latching mechanism 110 provided on the gates 50 and 52. In this manner, the gates 50 and 52 can be held in a stationary position in the water. Motors 116 are provided to raise and lower the latching mechanism 110. Vertical shafts 114 transmit power from the latching mechanism motor 116 to the latching mechanism 110.

Several cavities 112 may be provided at various positions along an arc on the bottom 74 of the bypass water body 14 in a direction perpendicular to the plane of the rotating gate 50 or 52. The latching mechanism 110 may be received in any of these cavities 112 to enable the gates 50 and 52 to be held in an open position without running the motor 68. In this way, the open positions of the gates 50 and 52 may be adjusted to satisfy the requirements of various ship sizes (i.e., it may not be necessary to completely open each gate).

The latching mechanism 110 may be mounted to the exterior of the gate 50 or 52, or it may be mounted within the gates 50 or 52. In either event, the latching mechanism 110 is arranged to extend outward from the bottom of the gate. Without the latching mechanism 110, it would be necessary to run the motors 68 in order to hold the gates in a fixed position.

The gates 50 and 52 also may be mounted on a track in order to assist in their movement and to minimize friction. The tracks may be installed at the bottom 74 of the bypass water body 14. These tracks could be made of metal, rubber or plastic. If metal is used, cathodic protection also should be provided to minimize rusting.

Both pump devices 60 are preferably mounted at the same or substantially the same optimal vertical height. If the pumps 60 are too high, they may not be submerged when the river is running low. If the pumps 60 are too low, the shaft 66 becomes too long, unwieldy and expensive.

One preferred embodiment of the invention includes two gates 50 and 52, both of which are movable. It may be necessary to open only one gate to allow smaller boats and ships to bypass the hydroturbine. Larger ships will require the opening of both gates, and this will divert more water from the hydroturbine.

Instead of both gates 50 and 52 being movable, it is possible that one of the two gates could be mounted in a stationary manner on a post. In this manner, only one of the gates 50 and 52 would be moved when a ship or boat approached the navigational bypass system.

Furthermore, one of the two gates 50 or 52 may be longer than the other gate, such that the two gates 50 and 52 meet at a location away from the center of the bypass water body 14. Different relative gate sizes may be used regardless of whether one or both gates are movable.

In order to prevent excessive water leakage from the gap between the gates 50 and 52, a seal 118 may be provided, as shown in FIG. 3. Additional seals 118 may be provided between the gate 50 and the structural island 12, and between the gate 52 and the land 18. For clarity, the seals 118 have been omitted from FIG. 5. The seals 118 may be made of rubber, plastic, or any other appropriate material.

Pressure reducing blades 120 are provided in the gates 50 and 52 to define an opening through the gates. These blades 120 are closed when the gates 50 and 52 are in the closed position and closed when the gates 50 and 52 are moving in the same direction as the river flow (which is also the same direction as the flow of water in the bypass water body 14). With the blades 120 closed as the gate moves in the direction of the river flow, the rushing river water will assist in moving the gate. When the gates 50 and 52 are moving in the opposite direction against the river flow, then the pressure reducing blades 120 are in an open position to create a hole through the gate. By allowing some water to flow through the gates 50 and 52 via the open blades 120, the power needed to move the gate against the river flow is reduced. The blades 120, which may be similar to venetian blinds, are opened, closed and adjusted by a blade control system 122 (e.g., a motor). While the illustrated embodiment shows horizontal blades 120, any other suitable pressure reducing means may be used, such as vertical blades, a sliding door, a swinging door, and the like.

The pressure reducing blades 120 reduce the power required to operate the gates and reduce wear and tear on the pump motor 68.

Figure 4:
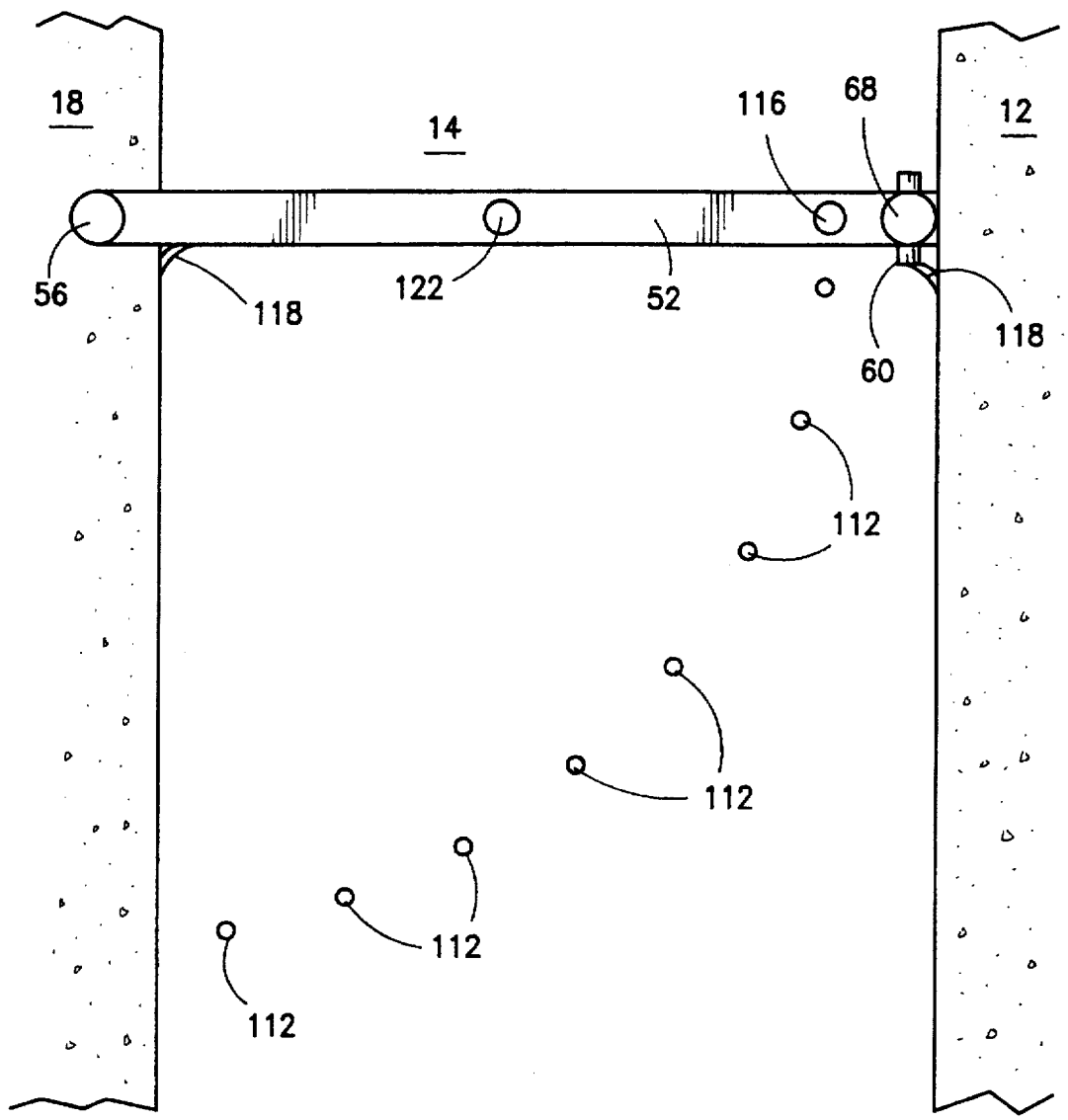
FIG. 4 is a top view of an embodiment of the invention wherein one gate and pump device assembly is used to open and close the navigational bypass.
Figure 6:
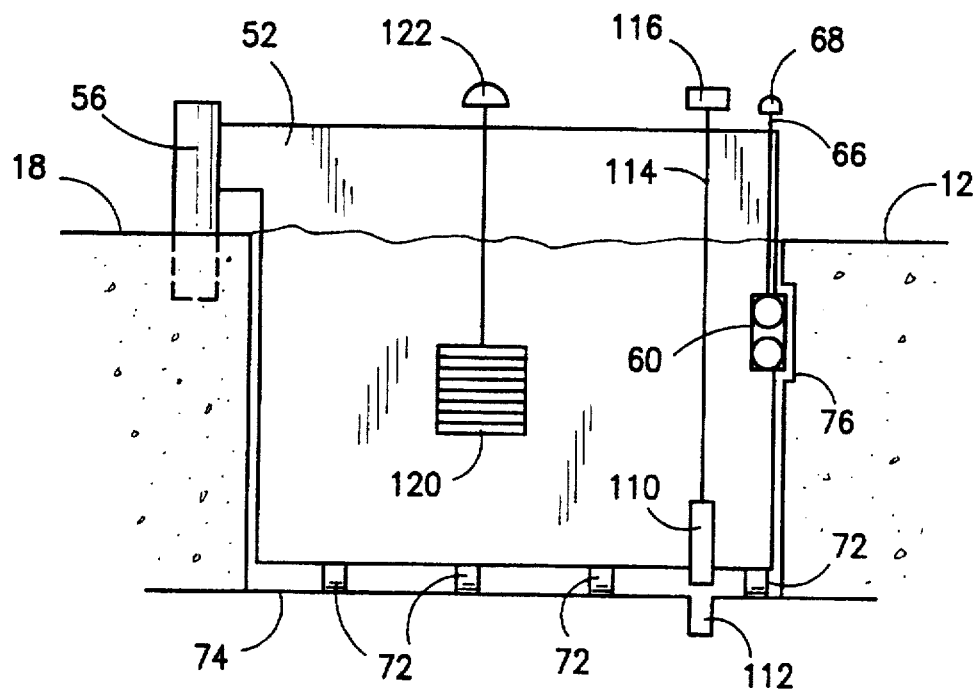
FIG. 6 is a front view of the embodiment of the invention wherein one gate and pump device assembly is used to open and close the navigational bypass.

FIGS. 4 and 6 illustrate the use of a single gate 52 across the bypass water body 14. The illustrated gate 52 has its hinge post 56 located on the land 18, and the pump 60 is provided near the structural island 12. However, the opposite arrangement also is possible without departing from the invention wherein the hinge post is located on the structural island 12, and the pump 60 is located near the land. In the embodiment illustrated in FIG. 6, a cut-out slot 76 is provided in the wall of the structural island 12 to provide additional room for the pump 60 when the gate 52 is closed. Alternatively, the pump 60 could be recessed into the wall of the gate 52 such that a cut-out slot 76 is unnecessary.

The embodiment of FIGS. 4 and 6 also includes the latching mechanism 110. The cavities 112 form an arc along the bottom 74 of the bypass water body 14. As described above, these cavities 112 hold the latching mechanism 110 (and thereby the gate) in any one of a variety of fixed positions. The motor 116 drives the vertical shaft 114 which raises or lowers the latching mechanism 110. Also, FIG. 4 shows seals 118 which are provided to prevent water from seeping through the gap between the gate 52 and the structural island 12 and/or the gap between the gate 52 and the river bank 18.

A pressure reducing means, such as blades 120, also is provided in this embodiment. As described above, the pressure reducing blades 120 are closed when the gate 52 is closed and when the gate 52 is moving in the same direction as the river flow. The blades 120 are open when the gate 52 is moving against the river flow. The control system 122 is used to open and close the blades 120.

Figure 7:
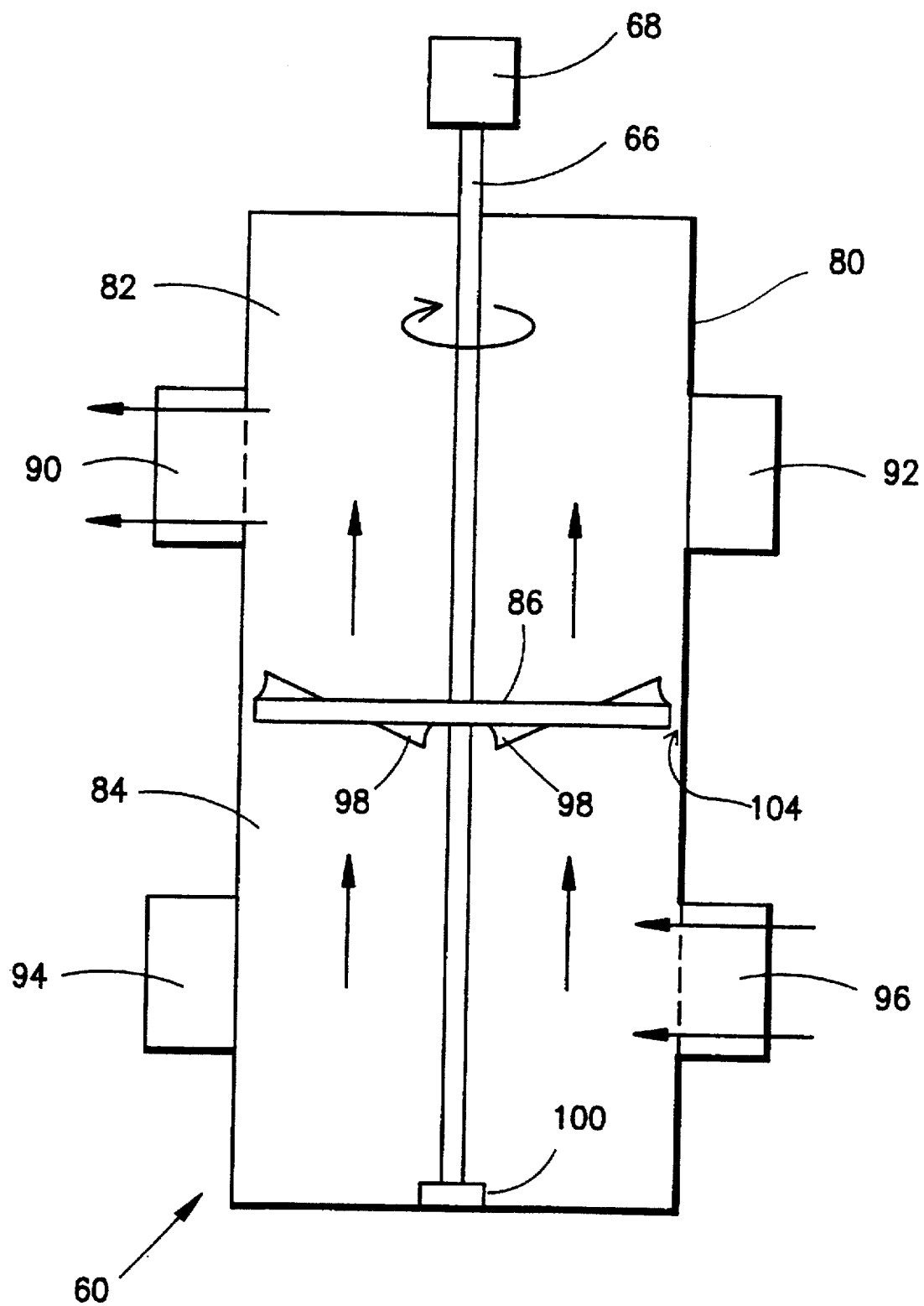
FIG. 7 is a more detailed view of the pump device wherein the valves are set so as to move the gate in a first direction.
Figure 8:
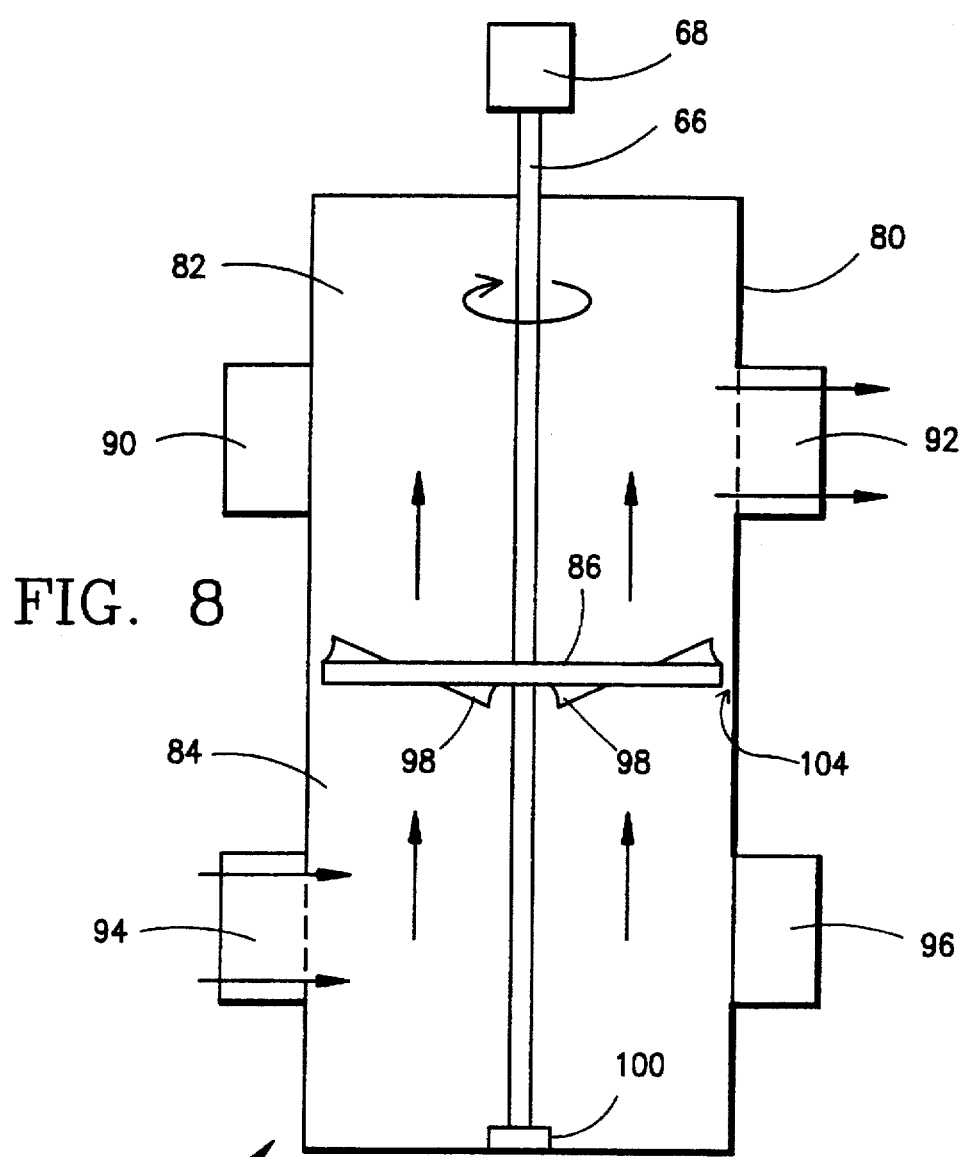
FIG. 8 is a more detailed view of the pump device wherein the valves are set so as to move the gate in a second direction.
Figure 9:
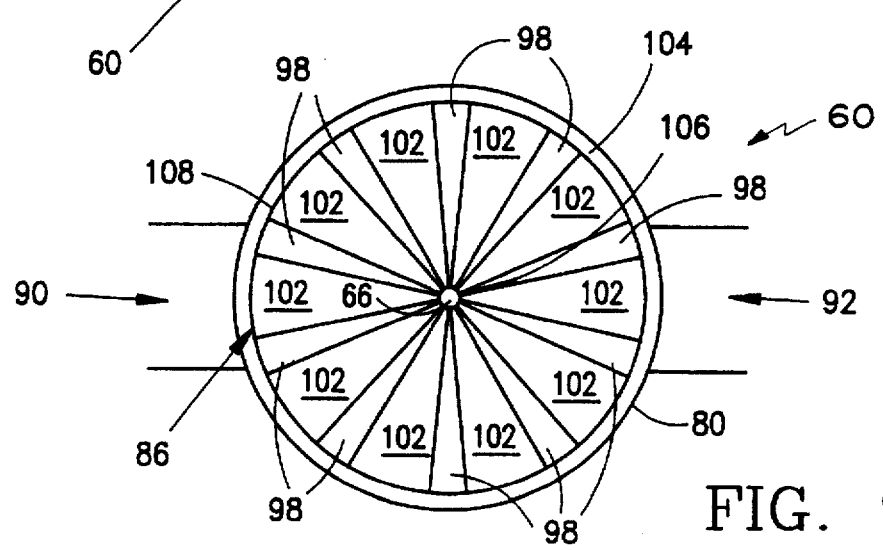
FIG. 9 is a top view of the pump device showing the impeller.

One suitable pump device 60 is described in more detail in conjunction with FIGS. 7-9. The pump device 60 includes a pump body 80 which is divided into a first, upper body portion 82 and a second, lower body portion 84. The pump motor 68 may be mounted at the top of the upper body portion 82, or alternatively, it may be mounted out of the water and on the gate, such as shown in FIG. 2. The shaft 66 extends from the motor 68 and into the pump body 80. An impeller 86 is mounted on the shaft 66 in an area of the pump body 80 so as to divide the pump body 80 into the first body portion 82 and the second body portion 84.

Four valves are arranged in the pump body 80 to define inlets and outlets for the pump 60. Preferably the valves are remotely controlled gate valves or butterfly valves, operated by motors which can be synchronous, squirrel cage or other appropriate design. Appropriate valves and electric motors for operating the valves may be selected based on various factors, such as gate size, bypass water flow rate, expected ship size, etc. A first valve 90 and a second valve 92 are provided in the first, upper body portion 82. A third valve 94 and a fourth valve 96 are provided in the second, lower body portion 84. It is not necessary that the impeller 86 be located exactly in the center of the two body portions 82 and 84, so long as it is located between the two upper valves 90 and 92 and the two lower valves 94 and 96. Pipes may be used with the valves 90, 92, 94 and 96 to extend the pump inlets and outlets away from the pump body 80 in the manner generally shown in FIGS. 7-9. Appropriate pipe and valve sizes may be readily selected by the person skilled in the art.

Impeller blades 98 are provided on the impeller 86. The impeller blades 98 are preferably fixed with respect to the shaft 66 and do not change pitch angle. Preferably, the bottom of the shaft 66 is mounted at the bottom of the pump casing 80 in an appropriate bearing arrangement 100. In this manner, if the motor 68 moves in only one direction, water will always move in one direction through the pump body 80. A uni-directional motor 68 and uni-directional impeller blades 98 makes the pump device relatively simple and less costly. On the other hand, the use of a two-directional motor and/or variable pitch impeller blades will not be a departure from this invention. A two-directional reversible motor can reduce the number of valves which are needed. The optimal combination of valves, motors and impeller blades will depend upon the relative cost of these mechanisms as economic conditions vary from time to time.

Those skilled in the art are familiar with impellers 86 and impeller blades 98. An appropriate impeller arrangement may be selected, depending on various factors, such as: water flow rate in the bypass water body; desired flow rate in the pump; uni-directional v. reversible pump; expected ship size; and bypass size.

As noted above, a reversible pump or a uni-directional pump may be used in this invention. If the pump is reversible, in the event that one or more valves stop working, or if routine maintenance is being performed on one or more valves, the pump can still move water in both directions (and consequently, the gate can move in both directions) if the pump motor and impeller are designed to rotate both clockwise and counter-clockwise. If the pump can rotate in only one direction, then four valves are needed. Thus, the reversible pump provides a safety feature which enables operation of the gate and pump even if one or two valves cease operating.

FIG. 7 shows the valve arrangement used to move the pump and gate assembly to the right (i.e., to rotate the gate in the counter-clockwise direction, when viewed from above). To move the gate and pump to the right, water is moved to the left. In the arrangement of FIG. 7, the first valve 90 and the fourth valve 96 are open, and the second valve 92 and the third valve 94 are closed. Therefore, under the rotary action of the impeller 86, water is pulled into the pump body 80 through the fourth valve 96, through and around the impeller 86, and out of the pump body 80 through the first valve 90. The vacuum effect induced at the inlet fourth valve 96 pulls the pump and attached gate to the right. Additionally, the jet effect induced at the outlet first valve 90 pushes the pump and attached gate to the right.

The valve arrangement for moving the pump and gate assembly to the left (i.e., to rotate the gate in the clockwise direction, when viewed from above) is shown in FIG. 8. To move the gate and pump to the left, water is moved to the right. In the arrangement of FIG. 8, the second valve 92 and the third valve 94 are open, and the first valve 90 and the fourth valve 96 are closed. Therefore, under the rotary action of the impeller, water is pulled into the pump body 80 through the third valve 94, through and around the impeller 86, and out of the pump body 80 through the second valve 92. The vacuum effect induced at the inlet third valve 94 pulls the pump and attached gate to the left. Additionally, the jet effect induced at the outlet second valve 92 pushes the pump and attached gate to the left.

As shown in FIGS. 7 and 8, in either valve arrangement, the impeller 86 is rotated in the same direction and water generally moves from the bottom portion 84 of the pump body 80 to the top portion 82 of the pump body 80. Screens or other filtering devices may be provided over the inlets and outlets so as to prevent unwanted debris or aquatic life from entering the pump 60.

An overhead view of the pump 60 is shown in FIG. 9. The pump shaft 66 extends from the motor (not shown) to an impeller base 106 of the impeller 86 which is mounted in the pump body 80 between the upper valves 90 and 92 and the lower valves 94 and 96. The impeller 86 looks similar to the propeller of a ship or boat. Several impeller blades 98 extend from the impeller base 106. These impeller blades 98 may extend to a circumferential edge 108 of the impeller 86 provided to connect the blades 98 together, or the distal ends of the impeller blades 98 may remain unconnected to one another. The impeller blades 98 also are twisted, in a manner known in the art, so as to induce movement of fluid through the pump body 80. Sufficient space 102 is maintained between the impeller blades 98 to allow water to pass through the impeller 86. Additionally, water may pass in the space 104 between the circumferential edge 108 of the impeller 86 (or the distal ends of the impeller blades 98) and the inside wall of the pump body 80.

The motor 68 used to operate the pump 60 may be selected, depending on the environment in which the pump 60 is used. A larger motor 68 would be used to operate a larger gate in a large bypass, but a smaller motor 68 may be sufficient for a smaller gate. The motor controls would preferably be located in a control house, remotely located from the gate and water (perhaps located on the structural island 12 or on the river bank 18). As noted above, a uni-directional or reversible pump may be used, depending on various factors, such as economic conditions.

Furthermore, the pump 60 need not be placed at the very end of the gate. In fact, the pump may be mounted at any location along the longitudinal length of the gate. An appropriate opening may be provided through the gate to allow the pump 60 to be mounted away from the end of the gate. The location of the pump 60 on the gate may influence the size of the motor 68 (i.e., the distance of the pump 60 and motor 68 from the hinge post 54 determines how much leverage is needed to move the gate).

While the invention has been described in terms of various preferred embodiments, those skilled in the art will appreciate that various changes and modifications can be made without departing from the spirit and scope of the invention, as defined in the appended claims.

I claim:

1. A gate for use in a fluid, comprising:
   a gate door including a first end and a second end, wherein a hinge mount area is provided at the first end of the gate door for mounting the gate door onto a hinge; and
   a pump device mounted at a position along a longitudinal length of the gate door or at the second end of the gate door, wherein the pump device includes:
   a motor;
   a pump body including a first body portion and a second body portion;
   a shaft connected to the motor and extending into the pump body;
   an impeller mounted on the shaft in an area of the pump body between the first body portion and the second body portion;
   a first valve provided in the first body portion;
   a second valve provided in the first body portion;
   a third valve provided in the second body portion; and
   a fourth valve provided in the second body portion,
   wherein, when the gate door is to be moved through the fluid in a first direction, the first valve and the fourth valve are open so that the fluid is pulled into the pump body by the impeller through the fourth valve and leaves the pump body through the first valve, and when the gate door is to be moved through the fluid in a second direction, the second valve and the third valve are open so that the fluid is pulled into the pump body by the impeller through the third valve and leaves the pump body through the second valve.

2. A gate as claimed in claim 1, wherein at least one wheel is provided at a bottom of the gate door to facilitate movement of the gate door through the fluid.

3. A gate as claimed in claim 1, wherein the motor is mounted on the gate door.

4. A navigational bypass system for use in conjunction with a body of water, comprising:
   a structural island for defining a main water body and a bypass water body, wherein the bypass water body extends between the structural island and an edge of the body of water;
   a first hinge post provided on either the structural island or on land along the body of water;
   a first gate attached to the first hinge post, wherein the first gate extends at least partially across the bypass water body, wherein the first gate includes:
   a first gate door having a first end and a second end, wherein a hinge mount area is provided at the first end of the first gate door for mounting the first gate door onto the first hinge post; and
   a pump device mounted at a position along a longitudinal length of the first gate door or at the second end of the first gate door, wherein the pump device includes:
   a motor;
   a pump body including a first body portion and a second body portion;
   a shaft connected to the motor and extending into the pump body;
   an impeller mounted on the shaft in an area of the pump body between the first body portion and the second body portion;
   a first valve provided in the first body portion;
   a second valve provided in the first body portion;
   a third valve provided in the second body portion; and
   a fourth valve provided in the second body portion,
   wherein, when the first gate door is to be moved through the water in a first direction, the first valve and the fourth valve are open so that water is pulled into the pump body by the impeller through the fourth valve and leaves the pump body through the first valve, and when the first gate door is to be moved through the water in a second direction, the second valve and the third valve are open so that water is pulled into the pump body by the impeller through the third valve and leaves the pump body through the second valve.

5. A navigational bypass system as claimed in claim 4, wherein at least one wheel is provided at a bottom of the first gate door to roll along a bottom of the bypass water body to facilitate movement of the first gate door through the bypass water body.

6. A navigational bypass system as claimed in claim 4, further including:
   a gate post provided on either the structural island or at the edge of the body of water, and a second gate attached to the gate post, wherein the second gate extends partially across the bypass water body.

7. A navigational bypass system as claimed in claim 4, further including:
   a second hinge post provided on either the structural island or on land along the water body, and a second gate attached to the second hinge post, wherein the second gate extends partially across the bypass water body.

8. A navigational bypass system as claimed in claim 7, wherein the second gate includes:

a second gate door including a first end and a second end, wherein a second hinge mount area is provided at the first end of the second gate door for mounting the second gate door onto the second hinge post; and a second pump device mounted at a position along a longitudinal length of the second gate door or at the second end of the second gate door.

9. A navigational bypass system as claimed in claim 8, wherein the second pump device includes:

a motor;

a pump body including a first body portion and a second body portion;

a shaft connected to the motor and extending into the pump body;

an impeller mounted on the shaft in an area of the pump body between the first body portion and the second body portion;

a first valve provided in the first body portion;

a second valve provided in the first body portion;

a third valve provided in the second body portion; and a fourth valve provided in the second body portion, wherein, when the second gate door is to be moved through the water in a first direction, the first valve and the fourth valve are open so that water is pulled into the pump body by the impeller through the fourth valve and leaves the pump body through the first valve, and when the second gate door is to be moved through the water in a second direction, the second valve and the third valve are open so that water is pulled into the pump body by the impeller through the third valve and leaves the pump body through the second valve.

10. A navigational bypass system as claimed in claim 8, wherein at least one wheel is provided at a bottom of the second gate door to roll along a bottom of the bypass water body to facilitate movement of the second gate door through the bypass water body.

11. A navigational bypass system as claimed in claim 4, wherein the first gate extends essentially completely across the bypass water body.

12. A navigational bypass system as claimed in claim 11, wherein at least one wheel is provided at a bottom of the first gate door to roll alone a bottom of the bypass water body to facilitate movement of the first gate door through the bypass water body.

13. A gate for use in a fluid, comprising:

a gate door including a first end and a second end, wherein a hinge mount area is provided at the first end of the gate door for mounting the gate door onto a hinge; and a pump device mounted at a position along a longitudinal length of the gate door or at the second end of the gate door;

a latching mechanism connected to the gate door such that the latching mechanism extends from a bottom of the gate door;

means for moving the latching mechanism; and pressure reducing means provided on the gate door to thereby reduce power required to move the gate in the fluid.

14. A gate as claimed in claim 13, wherein the means for moving the latching mechanism includes a motor connected to a shaft, wherein the shaft is movable to raise and lower the latching mechanism.

15. A gate as claimed in claim 13, wherein the pressure reducing means includes a plurality of blades provided across an opening defined in the gate door.

16. A gate as claimed in claim 15, further including a blade control means to selectively move the blades to open and close the opening.

17. A navigational bypass system for use in conjunction with a body of water, comprising:

a structural island for defining a main water body and a bypass water body, wherein the bypass water body extends between the structural island and an edge of the body of water, and wherein at least one cavity is defined in a bottom of the bypass water body;

a first hinge post provided on either the structural island or on land along the body of water; and a first gate attached to the first hinge post, wherein the first gate extends at least partially across the bypass water body, wherein the first gate includes:

a first gate door having a first end and a second end, wherein a hinge mount area is provided at the first end of the first gate door for mounting the first gate door onto the first hinge post; and a pump device mounted at a position along a longitudinal length of the first gate door or at the second end of the first gate door;

a latching mechanism connected to the gate door such that the latching mechanism may be extended from a bottom of the gate door and into the cavity in the bottom of the bypass water body;

means for moving the latching mechanism into and out of the cavity; and pressure reducing means provided on the gate door to thereby reduce power required to move the gate in the water.

18. A navigational bypass system as claimed in claim 17, wherein the means for moving the latching mechanism includes a motor connected to a shaft, wherein the shaft is movable to raise and lower the latching mechanism.

19. A navigational bypass system as claimed in claim 17, wherein the pressure reducing means includes a plurality of blades provided across an opening defined in the first gate door.

20. A navigational bypass system as claimed in claim 19, further including a blade control means to selectively move the blades to open and close the opening.

21. A navigational bypass system as claimed in claim 17, further including a seal to prevent water leakage between the structural island and the first gate.

22. A navigational bypass system as claimed in claim 17, further including a second gate which extends at least partially across the bypass water body toward the first gate, wherein a seal is provided to prevent water leakage through a gap between the first gate and the second gate.

23. A navigational bypass system as claimed in claim 17, further including a seal to prevent water leakage between the edge of the body of water and the first gate.

* * * * *